W. A. GWYNN.

SPARK PLUG.

APPLICATION FILED AUG. 6, 1920.

Reissued Oct. 12, 1920. 14,957.

Inventor:
William A. Gwynn.
By Elliott Thurman
Att'ys.

UNITED STATES PATENT OFFICE.

WILLIAM A. GWYNN, OF ST. LOUIS, MISSOURI, ASSIGNOR, BY MESNE ASSIGNMENTS, TO KING-BEE SPARK PLUG COMPANY, OF ST. LOUIS, MISSOURI.

SPARK-PLUG.

14,957. Specification of Reissued Letters Patent. Reissued Oct. 12, 1920.

Original No. 1,336,221, dated April 6, 1920, Serial No. 322,251, filed September 8, 1919. Application for reissue filed August 6, 1920. Serial No. 401,787.

*To all whom it may concern:*

Be it known that I, WILLIAM A. GWYNN, a citizen of the United States, residing in the city of St. Louis and State of Missouri, have invented new and useful Improvements in Spark-Plugs, of which the following is a specification.

This invention relates to spark plugs intended more particularly for use in automobiles and has the same general character illustrated and described in application filed of even date herewith.

The objects of the present invention are to provide means for insuring the correct distance of spark gap on the interior of the plug and for maintaining this distance under all normal conditions of operation.

The invention in its broad aspect, so far as it concerns the plug as a whole, is covered in the companion application referred to, and the present invention is directed to novel means for providing a spark gap in the interior of the plug, located in one of the terminal wires thereof.

In the accompanying drawing.

Figure 1:
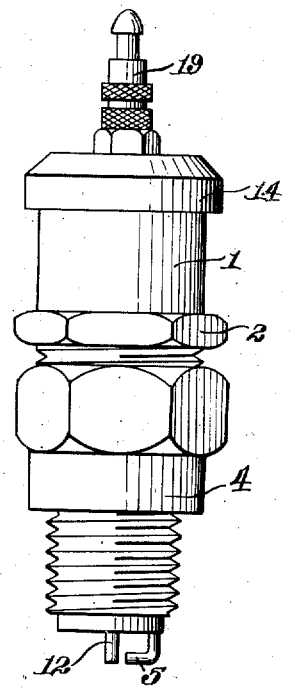
Figure 1 is a view in elevation of a spark plug constructed according to my invention.

Referring to the drawing, the numeral 1 indicates the upper member of a spark plug casing which is preferably provided with an integral nut 2 and has screwed on its lower end at 3 the lower casing member 4, which carries at its lower end one of the spark plug terminals 5. The casing member 4 is provided on its interior with an annular shoulder 6 which is adapted to support a gasket 7 on which rests a shouldered portion of a porcelain member 8. Above this shouldered portion the interior of the casing 4 and the porcelain 8 are correspondingly shouldered to receive a gasket 9 which is adapted to be engaged by the lower end of the casing member 1, which thus holds the porcelain member firmly to its seat 6. The upper portion of said porcelain member projects into the lower portion of the casing member 1 and is provided at its upper end with a relatively deep recess, the bottom of which is flat to provide a seat 11. Secured in the porcelain member 8 is a terminal wire 12 which projects downwardly into and through a recess 13 provided in the lower end of the porcelain member 8, and has its lower end located at a sparking distance from the terminal 5. The upper end of the terminal wire 12 is located at a certain distance below the plane of the seat 11. The numeral 14 indicates a porcelain plug which is mounted in the upper end of the casing member 1, and has centrally secured therein a conductor 15 in the form of a bar, the lower end portion of which bar projects downwardly a certain distance within the recess 10 and is centrally recessed from its lower end upward as indicated at 16. Frictionally engaging in the recess 16 is a stem 17 which carries at its lower end a flat plate 18 adapted to rest upon the seat 11. The upper end of the conductor 15 is provided with the usual binding screw 19.

From the construction described, it will be seen that I am enabled to provide a spark gap in the interior of the plug of a definite extent of separation, without liability of bringing the two terminal members 12 and 18 in contact when assembling the spark plug, and also to insure the said spark gap being maintained under all normal conditions of operation. That is to say, the extent of the spark gap may be accurately determined by the distance the upper end of the terminal wires 12 is located below the seat 11 in the porcelain member 8. When the porcelain plug 14 is placed in position in the casing 1, the terminal plate 18 must rest upon the seat 11 and is prevented from approaching any nearer to the end of the terminal 12.

Figure 4:
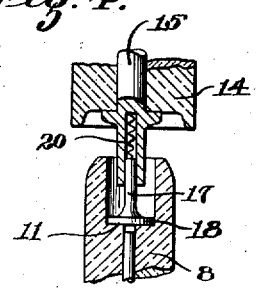
Fig. 4 is a similar view illustrating a further modification.
Figure 2:
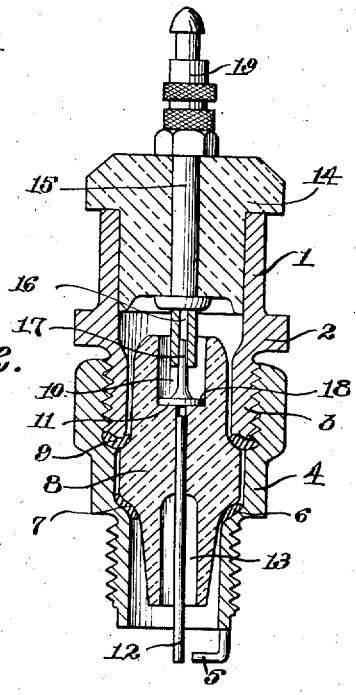
Fig. 2 is a central vertical sectional view thereof.

In assembling the parts, the stem 17 will slide upwardly under force in recess 16, so that no nice adjustment of the length of the bar 15 with respect to the end of the terminal wire 12 is required. At the same time, the frictional engagement of the stem 17 with the wall of the recess 16 is sufficiently great to prevent movement of the plate 18 after the parts have been adjusted in position. However, to provide against the contingency of such movement, I may adopt the construction shown in Fig. 4, in which a coil spring 20 is placed in the recess 16 to press on the stem 17 and thereby constantly force the terminal plate 18 into engagement with the seat 11.

Figure 3:
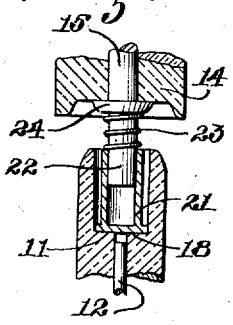
Fig. 3 is a broken view in central vertical section illustrating a modified construction of the spark gap terminals.

In Fig. 3 a still further modification is shown, in which the terminal plate 18 is provided with a hollow cylindrical extension 21 which is adapted to slidably receive the lower end portion 22 of the conductor 15, and a coil spring 23 is positioned between the upper end of the extension 21 and a shoulder 24 on the conductor 15, which engages the bottom of the plug 14. It will readily be seen that the extension 21 will slide over the end 22 of the conductor in assembling the parts, and that the spring 23 will hold the terminal plate 18 in engagement with the seat 11.

I claim:

1. In a spark plug, the combination with a spark plug casing, a porcelain member mounted therein and affording at its upper end a seat, a terminal wire secured in said porcelain member and having its upper end positioned below the plane of said seat, and a porcelain plug mounted in the upper end of said casing and having secured therein a conductor provided at its lower end with a terminal plate resting upon said seat.

2. In a spark plug, the combination with a spark plug casing, a porcelain member mounted therein and provided in its upper end with a recess affording a seat, a terminal wire secured in said porcelain member and having its upper end positioned below the plane of said seat, and a porcelain plug mounted in the upper end of said casing and having secured therein a conductor extending into said recess and provided at its lower end with a terminal plate resting upon said seat.

3. A spark plug according to claim 1, in which the terminal plate is relatively movable with respect to said conductor.

4. A spark plug according to claim 1, in which the lower end of the conductor is recessed and the terminal plate is provided with a stem frictionally engaging in said recess.

5. A spark plug according to claim 1, in which the terminal plate is slidably mounted with respect to said conductor and is yieldingly pressed by a spring against its seat.

6. A spark plug according to claim 1, in which the lower end of said conductor is recessed and provided with a coiled spring inserted in said recess and the terminal plate is provided with a stem working in said recess against said spring.

7. In a spark plug, the combination of a casing, a porcelain member mounted within said casing, a terminal carried by the porcelain member, an insulated terminal member carried by the casing and including a relatively movable part, said porcelain member having a seat to determine the position of the movable part, relative to said terminal members, whereby a gap of predetermined width may be formed between the terminal member and the movable part.

St. Louis, Missouri, July 2nd, 1920.

WILLIAM A. GWYNN.